UNITED STATES PATENT OFFICE

SAMUEL B. FISHER, OF PLEASANT UNITY, PENNSYLVANIA.

IMPROVEMENT IN PAINT COMPOSITIONS.

Specification forming part of Letters Patent No. 189,091, dated April 3, 1877; application filed January 13, 1877.

*To all whom it may concern:*

Be it known that I, SAMUEL B. FISHER, of Pleasant Unity, in the county of Westmoreland and State of Pennsylvania, have invented certain new and useful Improvements in Fire and Water Proof Paint Compositions; and I do hereby declare that the following is a full, clear, and exact description thereof, which will enable others skilled in the art to which it appertains to make and use the same.

To prepare my paint composition, I take of water four gallons, in which I boil four pounds of glue until dissolved. I then add two gallons of linseed oil, three pints of benzine, and eighteen pounds of Rosendale cement, or as much of the latter as may be required to bring the paint to proper consistency, so that it may be easily applied with a brush to the wall or roof which is to be painted. I prefer to apply the paint while warm.

The cement, which is the principal ingredient of my paint composition, renders it to a great extent fire-proof; the glue serves to bind the cement, and the various other ingredients give richness and body to the paint.

My paint composition may be used with especial advantage for the purpose of protecting shingle and other wooden roofs from fire and decay, it being cheap, easily prepared and applied, and very efficient for the purposes set forth.

Having thus described my invention, I claim and desire to secure by Letters Patent of the United States—

The paint composition herein described, consisting of Rosendale cement, water, glue, linseed-oil, and benzine, in about the proportions described, for the purpose specified.

SAMUEL B. FISHER.

Witnesses:
 THOS. A. BAIR,
 ALEX. BARNHART.